United States Patent Office 3,733,318
Patented May 15, 1973

3,733,318
21-ORTHOESTERS OF CORTICAL STEROIDS AND METHODS OF PREPARING SAME
Michael Marx, Sunnyvale, Calif., assignor to Syntex Corporation, Panama, Panama
No Drawing. Filed Mar. 23, 1972, Ser. No. 237,506
Int. Cl. C07c 173/00
U.S. Cl. 260—239.55 D        19 Claims

ABSTRACT OF THE DISCLOSURE 21-orthoesters of 16α- and 16β-hydro or methyl cortical steroids and 21-orthoesters of 16α,17α-cyclic acetal cortical steroids. The method of preparing such orthoesters comprises reacting the corresponding 21-hydroxy cortical steroid with an excess of an alkyl orthoester in the presence of a catalytic amount of a strong acid. These 21-orthoesters of cortical steroids have utility as antiinflammatory agents in the treatment of mammals.

BACKGROUND OF THE INVENTION

This invention relates to 21-orthoesters of cortical steroids and derivatives thereof and to methods of preparing such compounds. In a further aspect, this invention relates to 21-orthoesters of 16α- and 16β-hydro or methyl cortical steroids, 21-orthoesters of 16α,17α-cyclic acetal derivatives of cortical steroids and the 6 and /or 9 and/or 11 position halogenated derivatives thereof, and to the methods of preparing such compounds.

Since the discovery of the valuable therapeutic properties possessed by cortical steroids, extensive research and activity has been focused upon these compounds. Exemplary of the compounds developed during such research are the cortical steroid 21-monoesters (for example, see U.S. Pats. Nos. 2,842,567 and 3,048,581), the 2-orthocarbonate steroid derivatives (see U.S. Pat. No. 3,621,014) and the 17α,21-orthoesters of cortical steroids (for example, see Gardi et al., Tetrahedron Letters, 13, 448 (1961). As is obvious from their names, the orthoesters developed by prior workers, as exemplified by the 17α,21-orthoesters mentioned above, have two points of attachment to the steroid moiety, as opposed to the 21-orthoesters of the present invention, to be described in detail below, which have but a single point of attachment of the orthoester moiety to the steroid moiety.

SUMMARY OF THE INVENTION

The compounds of this invention are represented by the following formula:

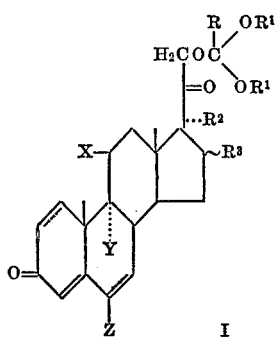

I wherein R is H, alkyl having from one to ten carbon atoms, cycloalkyl having 3 to 10 carbon atoms, or aryl; $R^1$ is a lower alkyl having from 1 to 5 carbon atoms, or together the two $R^1$ radicals form a monocyclic heterocyclic group having 3 or 4 carbon ring atoms; $R^2$ is hydroxy or acyloxy having from 1 to 12 carbon atoms; $R^3$ is H, α-methyl or β-methyl, or $R^2$ and $R^3$ form together the group

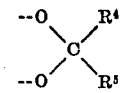

wherein $R^4$ and $R^5$ are independently selected from the group consisting of H, lower alkyls having from 1 to 5 carbon atoms, and aryl or together with the carbon atom to which they are joined $R^4$ and $R^5$ form a monocyclic alkyl group having 3 to 6 carbon atoms or a monocyclic heterocyclic group; when a double bond exists between C-6 and C-7, Z is H, fluoro, chloro, or methyl and when a single bond exists between C-6 and C-7, Z is

where $Z^1$ is H, fluoro, chloro or methyl $Z^2$ is H or fluoro, but $Z^2$ can be fluoro only when $Z^1$ is fluoro; X is oxo or the group

wherein $R^6$ is hydroxy, fluoro, or chloro; Y is H, fluoro, or chloro, but when $R^6$ is fluoro, Y is either H or chloro; and the dotted bond lines between the 1- and 2-position of the steroid A ring and the 6- and 7-position of the steroid B ring indicate either a single or a double bond.

The process of this invention for producing the 21-orthoesters defined above comprises treating a 21-hydroxy cortical steroid with a suitable orthoester having the formula:

$$R-C(OR^1)_3$$

wherein R and $R^1$ have the same meaning as set forth above, in the presence of a catalytic quantity of a suitable inert organic solvent. The resulting cortical steroid 21-orthoester is separated from the reaction mixture by any suitable technique or procedure such as, for example, thin layer or adsorption column chromatography, crystallization, and the like.

Formula I identified above encompasses, inter alia, two sub-groups, of 21-orthoesters of the present invention. These two groups are the 16α,17α-cyclic acetal-21-orthoester cortical steroids and the 16α- or 16β-hydro or methyl-21-orthoester cortical steroids of the present invention are represented by the following formula:

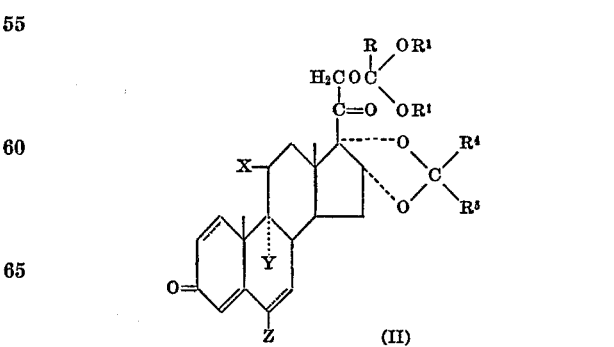

(II)

wherein R, $R^1$, $R^4$, $R^5$, X, Y, Z, and the dotted bond lines are as defined above with respect to Formula I.

The 16α- and 16β-hydro or methyl 21-orthoester cortical steroids of the present invention are represented by the following formula:

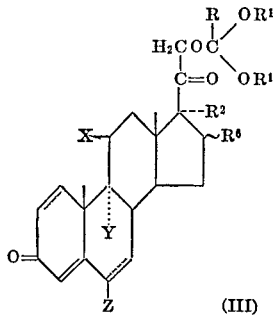

(III)

wherein $R^6$ is H, α-methyl, or β-methyl; and R, $R^1$, $R^2$, X, Y, Z, and the dotted bond lines are as defined above with respect to Formula I.

Obviously, in those compounds represented by Formulae I–III where a double bond exists between C–6 and C–7 in the steroid B ring, only a single Z substituent, which will be neither α or β, but in the plane of the steroid moiety, will be possible.

As used herein, the following terms have the following meanings. The term lower alkyl refers to straight and branched aliphatic hydrocarbon groups containing from one to five carbon atoms and includes, for example, methyl, ethyl, isopropyl, n-butyl, s-butyl groups and the like. The term alkyl refers to straight and branched chain aliphatic hydrocarbon groups containing from 1 to 10 carbon atoms and includes, for example, the aforementioned lower alkyl groups as well as groups such as, for example, hexyl, octyl, decyl, and the like. The term cycloalkyl refers to cyclic aliphatic hydrocarbon groups containing from 3 to 10 carbon atoms and includes such groups as cyclopropyl, cyclobutyl, cyclopentyl, and the like. The term aryl refers to groups containing at least one aromatic ring such as, for example, phenyl. Also encompassed within the term aryl are substituted aromatic rings containing one or more substituent groups such as, for example, lower alkyls and/or halogens, and the like. The terms acyloxy and acyl derivatives refer to those esters and acyls conventionally employed in the cortical steroid art having from one to twelve carbon atoms, preferably being derived from carboxylic acids. Typical acyloxy groups, expresed as the ester, include for example, acetate, propionate, butyrate, valerate, caproate, enanthate, caprylate, acrylate, undecenoate, phenoxyacetate, benzoate, phenylacetate, diphenylacetate, diethylacetate, trimethylacetate, cyclohexylacetate, cyclopentylpropionate, and the like. The term monocyclic alkyl refers to saturated cyclic aliphatic hydrocarbons having from 3 to 6 carbon atoms, optionally substituted with methyl, ethyl or isopropyl groups. Typical monocyclic alkyls include, for example, cyclopropyl, cyclobutyl, cyclopentyl, 3,4-dimethyl cyclopentyl, cyclohexyl, 4-methylcyclohexyl, 4-isopropylcyclohexyl, and the like. The term monocyclic heterocyclic refers to both saturated and unsaturated heterocyclic groups containing a single heterocyclic ring having from 4- to 6-ring atoms including at least one non-carbon ring atom selected from the group consisting of oxygen, sulfur, and nitrogen. Typical monocyclic heterocyclic groups include, for example, tetra-hydropyranyl, tetrahydrothiopyranyl, N-methylpiperidinyl, and the like. Further, unless expressely stated to the contrary, all temperatures refer to degrees centigrade.

21-orthoesters of the present invention encompassed by Formula II above include, for example:

11β-hydroxy-16α,17α-isopropylidenedioxy-pregn-4-ene-3,20-dione 21-methylorthoformate;
11β-hydroxy-16α,17α-isopropylidenedioxy-pregna-1,4-diene-3,20-dione 2-methylorthoformate;
16α,17α-isopropylidenedioxy-pregn-4-ene-3,11,20-trione 21-methylorthoformate;
16α,17α-isopropylidenedioxy-pregna-1,4-diene-3,11,20-trione 21-methylorthoformate;
6α-fluoro-11β-hydroxy-16α,17α-isopropylidenedioxy-pregna-1,4-diene-3,20-dione 21-methylorthoformate;
6α-fluoro-11β-hydroxy-16α,17α-isopropylidenedioxy-pregna-4-ene-3,20-dione 21-methylorthoformate;
6α,9α-difluoro-11β-hydroxy-16α,17α-isopropylidenedioxy-pregna-1,4-diene-3,20-dione 21-methylorthoformate;
6α,9α-difluoro-11β-hydroxy-16α,17α-isopropylidenedioxy-pregna-4-ene-3,20-dione 21-methylorthoformate;
9α,11β-dichloro-6α-fluoro-16α,17α-isopropylidenedioxy-pregna-1,4-diene-3,20-dione 21-methylorthaformate;
16α,17α-isopropylidenedioxy-pregn-1,4,6-triene-3,11,20-trione 21-methylorthoformate;
9α-chloro-16α,17α-isopropylidenedioxy-pregna-1,4-,-6-triene-3,11,20-trione 21-methylorthoformate;
6α,9α-difluoro-11β-hydroxy-16α,17α-isopropylidenedioxy-pregna-1,4,6-triene-3,20-dione 21-methylorthoformate;
6α-fluoro-16α,17α-isopropylidenedioxy-pregna-1,4-diene-3,11,20-trione 21-methylorthoformate;
6α-fluoro-16α,17α-isopropylidenedioxy-pregna-4-ene-3,11,20-trione 21-methylorthoformate;
6α,9α-difluoro-16α,17α-isopropylidenedioxy-pregna-1,4-diene-3,11,20-trione 21-methylorthaformate;
6α,9α-difluoro-16α,17α-isopropylidenedioxy-pregna-4-ene-3,11,20-trione 21-methylorthaformate;
9α,11β-dichloro-6α-fluoro-16α,17α-isopropylidenedioxy-pregna-1,4-diene-3,11,20-trione 21-methylorthoformate;
11β-hydroxy-16α,17α-methylenedioxy-pregna-4-ene-3,20-dione 21-ethylorthaformate;
11β-hydroxy-16α,17α-methylenedioxy-pregna-1,4-diene-3,20-dione 21-ethylorthaformate;
16α,17α-methylenedioxy-pregn-4-ene-3,11,20-trione 21-ethylorthaformate;
16α,17α-methylenedioxy-pregna-1,4-diene-3,11,20-trione 21-ethylorthoformate;
6α-fluoro-11β-hydroxy-16α,17α-methylenedioxy-pregna-1,4-diene-3,20-dione 21-ethylorthoformate;
6α-fluoro-11β-hydroxy-16α,17α-methylenedioxy-pregn-4-ene-3,20-dione 21-ethylformate;
6α,9α-difluoro-11β-hydroxy-16α,17α-methylenedioxy-pregna-1,4-diene-3,20,-dione 21-ethylorthaformate;
6α,9α-difluoro-11β-hydroxy-16α,17α-methylenedioxy-pregn-4-ene-3,20-dione 21-ethylorthoformate;
9,11β-dichloro-6α-fluoro-16α,17α-methylenedioxy pregna-1,4-diene-3,20-dione 21-ethylorthoformate;
16α,17α-methylenedioxy-pregn-1,4,6-triene-3,11,20-trione 21-ethylorthoformate;
9α-fluoro-16α,17α-methylenedioxy-pregna-1,4,6-triene-3,11,20-trione 21-ethylorthoformate;
6,9α-difluoro-11β-hydroxy-16α,17α-methylenedioxy-pregna-1,4,6-triene-3,20-dione 21-ethylorthoformate;
6α-fluoro-16α,17α-methylenedioxy-pregna-1,4-diene-3,11,20-trione 21-ethylorthoformate;
6α-fluoro-16α,17α-methylenedioxy-pregn-4-ene-3,11,20-trione 21-ethylorthoformate;
6α,9α-difluoro-16α,17-methylenedioxy-pregna-1,4-diene-3,11,20-trione 21-ethylorthoformate;
6,9α-difluoro-16α,17α-methylenedioxy-pregn-4-ene-3,11,20-trione 21-ethylorthoformate;
9α,11β-dichloro-6α-fluoro-16α,17α-methylenedioxy-pregna-1,4-diene-3,11,20-trione 21-ethylorthoformate;
11β-hydroxy-16α,17α-(3'-pentylidenedioxy)-pregn-4-ene-3,20-dione 21-isopropylorthobenzoate;
11β-hydroxy-16α,17α-(3'-pentylidenedioxy)-pregna-1,4-diene-3,20-dione 21-isopropylorthobenzoate;
16α,17α-(3'-pentylidenedioxy)-pregn-4-ene-3,11,20-trione 21-isopropylorthobenzoate;
16α,17α-(3'-pentylidenedioxy)-pregna-1,4-diene-3,11,20-trione 21-isopropylorthobenzoate;
6α-fluoro-11β-hydroxy-16α,17α-(3'pentylidenedioxy)-pregna-1,4-diene-3,20-dione 21-isopropylorthobenzoate;

6α-fluoro-11β-hydroxy-16α,17α-(3'-pentylidienedioxy)-pregn-4-ene-3,20-dione 21-isopropylorthobenzoate;

6α,9α-difluoro-11β-hydroxy-16α,17α-(3'pentylidenedioxy)-pregna-1,4-diene-3,20-dione 21-isopropylorthobenzoate;

6α,9α-difluoro-11β-hydroxy-16α,17α-(3'-pentylidenedioxy)-pregna-4-ene-3,20-dione 21-isopropylorthobenzoate;

9α,11β-dichloro-6α-fluoro-16α,17α-(3'-pentylidenedioxy)-pregna-1,4-diene-3,20-dione 21-isopropylorthobenzoate;

16α,17α-(3'-pentylidenedioxy)-pregn-1,4,6-triene-3,11,20-trione 21-isopropylorthobenzoate;

9α-fluoro-16α,17α-(3'pentylidenedioxy)-pregna-1,4,6-triene-3,11,20-trione 21-isopropylorthobenzoate;

6α,9α-difluoro-11β-hydroxy-16α,17α-(3'-pentylidene dioxy) pregna-1,4,6-triene-3,20-dione 21-isopropylorthobenzoate;

6α-fluoro-16α,17α-(3'-pentylidenedioxy)-pregna-1,4-diene-3,11,20-trione 21-isopropylorthobenzoate;

6α-fluoro-16α,17α-(3'-pentylidenedioxy)-pregna-4-ene-3,11,20-tfrione 21-isopropylorthobenzoate;

6α,9α-difluoro-16α,17α-(3'-pentylidenedioxy)-pregna-1,4-diene-3,11,20-trione 21-isopropylorthobenzoate;

6α,9α-difluoro-16,17α-(3'-pentylidenedioxy)-pregna-4-ene-3,11,20-trione 21-isopropylorthobenzoate;

9α,11β-dichloro-6α-fluoro-16α,17α-(3'pentylidenedioxy)-pregna-1,4-diene-3,11,20-trione 21-isopropylorthobenzoate;

9α-chloro-16α,17α-isopropylidenedioxy-pregna-1,4,6-triene-3,11,20-trione 21-methylorthoformate;

11β-hydroxy-16α,17α-isopropylidenedioxy-pregna-1,4-diene-3,20-dione 21-cyclic ethylene orthoformate;

6α,9α-difluoro-11β-hydroxy-16α,17α-isopropylidenedioxy-pregna-1,4-diene-3,20-dione 21-cyclic ethylene orthoformate;

9α,11β-dichloro-6α-fluoro-16α,17α-isopropylidenedioxy-pregna-1,4-diene-3,20-dione 21-cyclic ethylene orthoformate;

6α,9α-difluoro-11β-hydroxy-16α,17α-isopropylidenedioxy-pregna-1,4,6-triene-3,20-dione 21-cyclic ethylene orthoformate;

6α,9α-difluoro-11β-hydroxy-16α,17α-methylenedioxy-pregna-1,4-diene-3,20-dione 21-cyclic ethylene orthoformate;

6α-fluoro-11β-hydroxy-16α,17α-isopropylidenedioxy-pregna-1,4-diene-3,20-dione 21-cyclic ethylene orthoformtae; and 9α-fluoro-11β-hydroxy-16α,17α-isopropylidenedioxy-pregna-1,4-diene-3,20-dione 21-cyclic ethylene orthoformate.

Of the compounds of Formula II above, the following compounds, respectively represented by the following structural formulae are of particular interest:

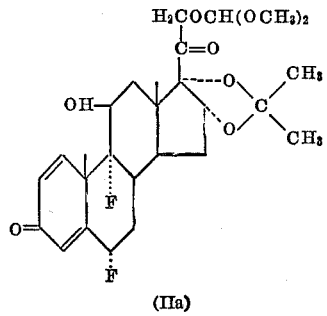

(IIa)

6α,9α - difluoro - 11β - hydroxy-16α,17α-isopropylidenedioxy-pregna-1,4-diene-3,20-dione-21-methylorthoformate

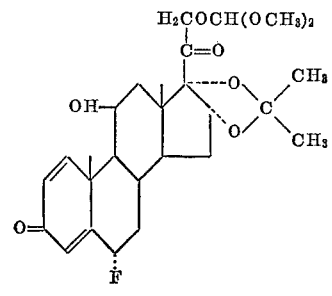

(IIb)

6α - fluoro - 11β - hydroxy-16,17α-isopropylidenedioxy - pregna-1,4-diene - 3,20 - dione - 21-methylorthoformate

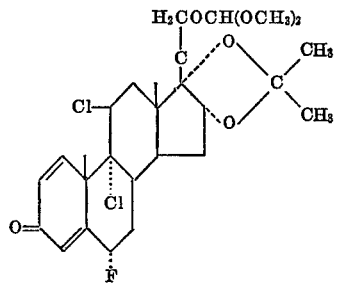

(IIc)

9α,11β - dichloro - 6α - fluoro-16α,17α - isopropylidenedioxy - pregna-1,4 - diene-3,20-dione 21-methylorthoformate

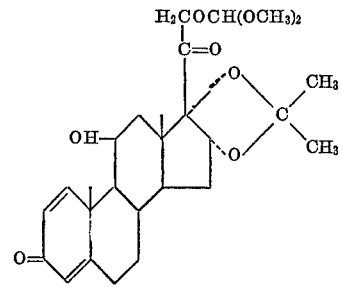

(IId)

11β - hydroxy-16α,17α-isopropylidenedioxy-pregna - 1,4 - diene-3,20-dione-21-methylorthoformate

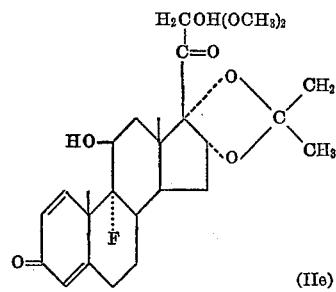

(IIe)

9α - fluoro - 11β - hydroxy - 16α,17α - isopropylidenedioxy-pregna-1,4-diene-3,20-dione-21-methylorthoformate 16α - methyl or 16β-methyl cortical steroid 21-orthoesters of the present invention encompassed by Formula III include, for example:

11β,17α-dihydroxy-16α-methyl-pregn-4-ene-3,20-dione 21-methylorthoformate;
11β,17α-dihydroxy-16-methyl-pregna-1,4-diene-3,20-dione 21-methylorthoformate;
9α,chloro-11β,17α-dihydroxy-16-methyl-pregn-4-ene-3,20-dione 21methylorthoformate;
9α-chloro-11β,17α-dihydroxy-16α-methyl-pregna-1,4-diene-3,20-dione 21-methylorthoformate;
9α-fluoro-11β,17α-dihydroxy-16α-methyl-pregn-4-ene-3,20-dione 21-methylorthoformate;
9α-fluoro-11β,17α-dihydroxy-16α-methyl-pregna-1,4-diene-3,20-dione 21-methylorthoformate;
6α,9α-difluoro-11β,17α-dihydroxy-16β-methyl-pregn-4-ene-3,20-dione 21-methylorthoformate;
6α,9α-difluoro-11β,17α-dihydroxy-16α-methyl-pregna-1,4-diene-3,20-dione 21-methylorthoformate;
6α,6β,9α-trifluoro-11β, 17α-dihydroxy-16α-methyl-pregn-4-ene-3,20-dione 21-methylorthoformate;
6α,6β,9α-trifluoro-11β,17α-dihydroxy-16α-methyl-pregna-1,4-diene-3,20-dione 21-methylorthoformate;
11β-hydroxy-16α-methyl-17α-propionyloxy-pregn-4-ene-3,20-dione 21-methylorthoformate;
11β-hydroxy-16α-methyl-17α-propionyloxy-pregna-1,4-diene-3,20-dione 21-methylorthoformate;
9α-chloro-11β-hydroxy-16α-methyl-17α-propionyloxy-pregn-4-ene-3,20-dione 21-methylorthoformate;
9α-chloro-11β-hydroxy-16α-methyl-17α-propionyloxy-pregna-1,4-diene-3,20-dione 21-methylorthoformate;
9α-fluoro-11β-hydroxy-16α-methyl-17α-propionyloxy-pregn-4-ene-3,20-dione 21-methylorthoformate;
9α-fluoro-11β-hydroxy-16α-methyl-17α-propionyloxy-pregna-1,4-diene-3,20-dione 21-methylorthoformate;
6α,9α-difluoro-11β-hydroxy-16α-methyl-17α-propionyloxy-pregn-4-ene-3,20-dione 21-methylorthoformate;
6α,9α-difluoro-11β-hydroxy-16α-methyl-17α-propionyloxy-pregna-1,4-diene-3,20-dione 21-methylorthoformate;
6α,6β,9α-trifluoro-11β-hydroxy-16α-methyl-17α-propionyloxy-pregn-4-ene-3,20-dione 21-methylorthoformate;
6α,6β-9α-trifluoro-11β-hydroxy-16α-methyl-17α-propionyloxy-pregna-1,4-diene-3,20-dione 21-methylorthoformate;
11β-hydroxy-16α-methyl-17α-pentanoyloxy-pregn-4-ene-3,20-dione 21-methylorthoformate;
11β-hydroxy-16α-methyl-17α-pentanoyloxy-pregna-1,4-diene-3,20-dione 21-methylorthoformate;
9α-chloro-11β-hydroxy-16α-methyl-17α-pentanoyloxy-pregn-4-ene-3,20-dione 21-methylorthoformate;
9α-chloro-11β-hydroxy-16α-methyl-17α-pentanoyloxy-pregna-1,4-diene-3,20-dione 21-methylorthoformate;
9α-fluoro-11β-hydroxy-16α-methyl-17α-pentanoyloxy-pregn-4-ene-3,20-dione 21-methylorthoformate;
9α-fluoro-11β-hydroxy-16α-methyl-17α-pentanoyloxy-pregna-1,4-diene-3,20-dione 21-methylorthoformate;
6α,9α-difluoro-11β-hydroxy-16α-methyl-17α-pentanoyloxy-pregn-4-ene-3,20-dione 21-methylorthoformate;
6α,9α-difluoro-11β-hydroxy-16α-methyl-17α-pentanoyloxy-pregna-1,4-diene-3,20-dione 21-methylorthoformate;
6α,6β,9α-trifluoro-11β-hydroxy-16α-methyl--17α-pentanoyloxy-pregn-4-en-3,20-dione 21-methylorthoformate;
6α,6β,9α-trifluoro-11β-hydroxy-16α-methyl-17α-pentanoyloxy-pregna-1,4-diene-3,20-dion 21-methylorthoformate;
9α-chloro-17β,17α-dihydroxy-16α-methyl-pregn-4-ene-3,20-dione 21-methylorthoformate;
6α,9α-difluoro-11β,17α-dihydroxy-16α-methyl-pregn-4-ene-3,20-dione 21-methylorthoformate;
11β-hydroxy-16α-methyl-17α-propionyloxy-pregn-4-ene-3,20-dione 21-methylorthoformate;
9α-fluoro-11β-hydroxy-16α-methyl-17α-propionyloxy-pregn-4-ene-3,20-dione 21-methylorthoformate;
6α,6β,9α-trifluoro-11β-hydroxy-16α-methyl-17α-propionyloxy-pregn-4-ene-3,20-dione 21-ethylorthoformate;
9α-chloro-11β-hydroxy-16α-methyl-17α-pentanoyloxy-pregn-4-en-3,20-dione 21-ethylorthoformate;
6α,9α-difluoro-11β-hydroxy-16α-methyl-17α-pentanoyloxy-pregn-4-ene-3,20-dione 21-ethylorthoformate;
11β,17α-dihydroxy-16αmethyl-pregna-1,4-diene-3,20-dione-21-ethylorthoformate;
9α-chloro-11β,17α-dihydroxy-16α-methyl-pregna-1,4-diene-3,20-dione 21-ethylorthoformate;
9α-fluoro-11β,17α-dihydroxy-16α-methyl-pregna-1,4-diene-3,20-dione 21-ethylorthoformate;
6α,9α-difluoro-11β,17α-dihydroxy-16α-methyl-pregna-1,4-diene-3,20-dione 21-ethylorthoformate;
6α,6β,9α-trifluoro-11β,17α-dihydroxy-16α-methyl-pregna-1,4-diene-3,20-dione 21-ethylorthoformate;
11β-hydroxy-16α-methyl-17α-propionyloxy-pregna-1,4-diene-3,20-dione 21-ethylorthoformate;
9α-chloro-11β-hydroxy-16α-methyl-17α-propionyloxy-pregna-1,4-diene-3,20-dione 21-ethylorthoformate;
9α-fluoro-11β-hydroxy-16α-methyl-17α-propionyloxy-pregna-1,4-diene-3,20-dione 21-ethylorthoformate;
6α,9α-difluoro-11β-hydroxy-16α-methyl-17α-propionyloxy-pregna-1,4-diene-3,20-dione 21-ethylorthoformate;
6α,6β,9α-trifluoro-11β-hydroxy-16α-methyl-17α-propionyloxy-pregna-1,4-diene-3,20-dione 21-ethylorthoformate;
11β-hydroxy-16α-methyl-17α-pentanoyloxy-pregna-1,4-diene-3,20-dione 21-ethylorthoformate;
9α-chloro-11β-hydroxy-16α-methyl-17α-pentanoyloxy-pregna-1,4-diene-3,20-dione 21-ethylorthoformate;
9α-fluoro-11β-hydroxy-16α-methyl-17α-pentanoyloxy-pregna-1,4-diene-3,20-dione 21-ethylorthoformate;
6α,9α-difluoro-11β-hydroxy-16α-methyl-17α-pentanoyloxy-pregna-1,4-diene-3,20-dione 21-ethylorthoformate;
6α,6β,9α-trifluoro-11β-hydroxy-16α-methyl-17α-pentanoyloxy-pregna-1,4-diene-3,20-dione 21-ethylorthoformate;
17α-decanoyloxy-11β-hydroxy-16α-methyl-pregna-1,4-diene-3,20-dione 21-pentylorthobenzoate;
17α-decanoyloxy-9α-fluoro-11β-hydroxy-16α-methyl-pregna-1,4-diene-3,20-dione 21-pentylorthobenzoate;
6α,9α-dichloro-17α-decanoyloxy-11β-hydroxy-16α-methyl-pregna-1,4-diene-3,20-dione 21-pentylorthobenzoate;
6α,6β,9α-trichloro-17α-decanoyloxy-11β-hydroxy-16α-methyl-pregna-1,4-diene-3,20-dione 21-pentylorthobenzoate;
17α-heptanoyloxy-11β-hydroxy-16α-methyl-pregn-4-ene-3, 20-dione 21-ethylorthoformate;
17α-heptanoyloxy-11β-hydroxy-16α-methyl-pregna-1,4-diene-3,20-dione 21-ethylorthoformate;
6α-chloro-17α-heptanoyloxy-11β-hydroxy-16α-methyl-pregn-4-ene-3,20-dione 21-ethylorthoformate;
6α-chloro-17α-heptanoyloxy-11β-hydroxy-16α-methyl-pregna-1,4-diene-3,20-dione 21-ethylorthoformate;
9α-fluoro-11β,17α-dihydroxy-16α-methyl-pregna-1,4,6-triene-3,20-dione 21-ethylorthoformate;
9α-chloro-11β,17α-dihydroxy-16α-methyl-pregna-1,4,6-triene-3,20-dione 21-ethylorthoformate;
6α,6β,9α-trifluoro-17α-heptanoyloxy-11β-hydroxy-16α-methyl-pregn-4-ene-3,20-dione 21-ethylorthoformate;
6α,6β,9α-trifluoro-17α-heptanoyloxy-11β-hydroxy-16α-methyl-pregna-1,4-diene-3,20-dione 21-ethylorthoformate;
9α-chloro-17α-hydroxy-16α-methyl-pregn-4-ene-3,11,20-trione 21-methylorthoformate;
9α-fluoro-17α-hydroxy-16α-methyl-pregna-1,4-diene-3,11,20-trione 21-methylorthoformate;

6α,6β,9α-trifluoro-17α-hydroxy-16α-methyl-pregn-4-ene-3,11,20-trione 21-methylorthoformate;
16α-methyl-17α-propionyloxy-pregna-1,4-diene-3,11,20-trione 21-methylorthoformate;
9α-fluoro-16α-methyl-17α-propionyloxy-pregn-4-ene-3,11,20-trione 21-methylorthoformate;
6α,9α-difluoro-16α-methyl-17α-propionyloxy-pregna-1,4-diene-3,11,20-trione 21-methylorthoformate;
16α-methyl-17α-pentanoyloxy-pregn-4-ene-3,11,20-trione 21-methylorthoformate;
9α-chloro-16α-methyl-17α-pentanoyloxy-pregna-1,4-diene-3,11,20-trione 21-methylorthoformate;
6α,9α-difluoro-16α-methyl-17α-pentanoyloxy-pregn-4-ene-3,11,20-trione 21-methylorthoformate;
6α,6β,9α-trifluoro-16α-methyl-17α-pentanoyloxy-pregna-1,4-diene-3,11,20-trione 21-methylorthoformate;
16α-methyl-17α-propionyloxy-pregn-4-ene-3,11,20-trione 21-ethylorthoformate;
9α-chloro-16α-methyl-17α-pentanoyloxy-pregn-4-ene-3,11,20-trione 21-ethylorthoformate;
9α-chloro-17α-hydroxy-16α-methyl-pregna-1,4-diene-3,11,20-trione 21-ethylorthoformate;
6α,6β,9α-trifluoro-17α-hydroxy-16α-methyl-pregna-1,4-diene-3,11,20-trione 21-ethylorthoformate;
9α-fluoro-16α-methyl-17α-propionyloxy-pregna-1,4-diene-3,11,20-trione 21-ethylorthoformate;
16α-methyl-17α-pentanoyloxy-pregna-1,4-diene-3,11,20-trione 21-ethylorthoformate;
6α,9α-difluoro-16α-methyl-17α-pentanoyloxy-pregna-1,4-diene-3,11,20-trione 21-ethylorthoformate;
9α-fluoro-17α-decanoyloxy-16α-methyl-pregna-1,4-diene-3,11,20-trione 21-pentylorthobenzoate;
17α-heptanoyloxy-16α-methyl-pregn-4-ene-3,11,20-trione 21-ethylorthoformate;
6α-chloro-17α-heptanoyloxy-16α-methyl-pregna-1,4-diene-3,11,20-trione 21-ethylorthoformate;
6α,6β,9α-trifluoro-17α-heptanoyloxy-16α-methyl-pregna-1,4-diene-3,11,20-trione 21-ethylorthoformate;
11β,17α-dihydroxy-16β-methyl-pregn-4-ene-3,20-dione 21-methylorthoformate;
11β,17α-dihydroxy-16β-methyl-pregna-1,4-diene-3,20-dione 21-methylorthoformate;
9α-chloro-11β,17α-dihydroxy-16β-methyl-pregn-4-ene-3,20-dione 21-methylorthoformate;
9α-chloro-11β,17α-dihydroxy-16β-methyl-pregna-1,4-diene-3,20-dione 21-methylorthoformate;
9α-fluoro-11β,17α-dihydroxy-16β-methyl-pregn-4-ene-3,20-dione 21-methylorthoformate;
9α-fluoro-11β,17α-dihydroxy-16β-methyl-pregna-1,4-diene-3,20-dione 21-methylorthoformate;
6α,9α-difluoro-11β,17α-dihydroxy-16β-methyl-pregn-4-ene-3,20-dione 21-methylorthoformate;
6α,9α-difluoro-11β,17α-dihydroxy-16β-methyl-pregna-1,4-diene-3,20-dione 21-methylorthoformate;
6α,6β,9α-trifluoro-11β,17α-dihydroxy-16β-methyl-pregn-4-ene-3,20-dione 21-methylorthoformate;
6α,6β,9α-trifluoro-11β,17α-dihydroxy-16β,methyl-pregna-1,4-diene-3,20-dione 21-methylorthoformate;
11β-hydroxy-16β-methyl-17α-propionyloxy-pregn-4-ene-3, 20-dione 21-methylorthoformate;
11β-hydroxy-16β-methyl-17α-propionyloxy-pregna-1,4-diene-3,20-dione 21-methylorthoformate;
9α-chloro-11β-hydroxy-16β-methyl-17α-propionyloxy-pregn-4-ene-3,20-dione 21-methylorthoformate;
9α-chloro-11β-hydroxy-16β-methyl-17α-propionyloxy-pregna-1,4-diene-3,20-dione 21-methylorthoformate;
9α-fluoro-11β-hydroxy-16β-methyl-17α-propionyloxy-pregn-4-ene-3,20-dione 21-methylorthoformate;
9α-fluoro-11β-hydroxy-16β-methyl-17α-propionyloxy-pregna-1,4-diene-3,20-dione 21-methylorthoformate;
6α,9α-difluoro-11β-hydroxy-16β-methyl-17α-propionyloxy-pregn-4-ene-3,20-dione 21-methylorthoformate;
6α,9α-difluoro-11β-hydroxy-16β-methyl-17α-propionyloxy-pregna-1,4-diene-3,20-dione 21-methylorthoformate;
6α,6β,9α-trifluoro-11β-hydroxy-16β-methyl-17αpropionyloxy-pregn-4-ene-3,20-dione 21-methylorthoformate;
6α,6β,9α-trifluoro-11β-hydroxy-16β-methyl-17α-propionyloxy-pregna-1,4-diene-3,20-dione 21-methylorthoformate;
11β-hydroxy-16β-methyl-17α-pentanoyloxy-pregn-4-ene-3,20-dione 21-methylorthoformate;
11β-hydroxy-16β-methyl-17α-pentanoyloxy-pregna-1,4-diene-3,20-dione 21-methylorthoformate;
9α-chloro-11β-hydroxy-16β-methyl-17α-pentanoyloxy-pregn-4-ene-3,20-dione 21-methylorthoformate;
9α-chloro-11β-hydroxy-16β-methyl-17α-pentanoyloxy-pregna-1,4-diene-3,20-dione 21-methylorthoformate;
9α-fluoro-11β-hydroxy-16β-methyl-17α-pentanoyloxy-pregn-4-ene-3,20-dione 21-methylorthoformate;
9α-fluoro-11β-hydroxy-16β-methyl-17α-pentanoyloxy-pregna-1,4-diene-3,20-dione 21-methylorthoformate;
6α,9α-difluoro-11β-hydroxy-16β-methyl-17α-pentanoyloxy-pregn-4-ene-3,20-dione 21-methylorthoformate;
6α,9α-difluoro-11β-hydroxy-16β-methyl-17α-pentanoyloxypregna-1,4-diene-3,20-dione 21-methylorthoformate;
6α,6β,9α-trifluoro-11β-hydroxy-16β-methyl-17α-pentanoyloxypregn-4-ene-3,20-dione 21-methylorthoformate;
6α,6β,9α-trifluoro-11β-hydroxy-16β-methyl-17α-pentanoyloxypregna-1,4-diene,3,20-dione 21-methylorthoformate;
9α-chloro-11β,17α-dihydroxy-16β-methyl-pregn-4-ene-3,20-dione 21-ethylorthoformate;
6α,9α-difluoro-11β,17α-dihydroxy-16β-methyl-pregn-4-ene-3,20-dione 21-ethylorthoformate;
11β-hydroxy-16β-methyl-17α-propionyloxy-pregn-4-ene-3,20-dione 21-ethylorthoformate;
9α-fluoro-11β-hydroxy-16β-methyl-17α-propionyloxy-pregn-4-ene-3,20-dione 21-ethylorthoformate;
6α,6β,9α-trifluoro-11β-hydroxy-16β-methyl-17α-propionyloxypregn-4-ene-3,20-dione 21-ethylorthoformate;
9α-chloro-11β-hydroxy-16β-methyl-17α-pentanoyloxy-pregn-4-ene-3,20-dione 21-ethylorthoformate;
6α,9α-difluoro-11β-hydroxy-16β-methyl-17α-pentanoyloxy-pregn-4-ene-3,20-dione 21-ethylorthoformate;
11β,17α-dihydroxy-16β-methyl-pregna-1,4-diene-3,20-dione-21-ethylorthoformate;
9α-chloro-11β,17α-dihydroxy-16β-methyl-pregna-1,4-diene-3,20-dione 21-ethylorthoformate;
9α-fluoro-11β,17α-dihydroxy-16β-methyl-pregna-1,4-diene-3,20-dione 21-ethylorthoformate;
6α,9α-difluoro-11β,17α-dihydroxy-16β-methyl-pregna-1,4-diene-3,20-dione 21-ethylorthoformate;
6α,6β,9α-trifluoro-11β,17α-dihydroxy-16β-methyl-pregna-1,4-diene-3,20-dione 21-ethylorthoformate;
11β-hydroxy-16β-methyl-17α-propionyloxy-pregna-1,4-diene-3,20-dione 21-ethylorthoformate;
9α-chloro-11β-hydroxy-16β-methyl-17α-propionyloxy-pregna-1,4-diene-3,20-dione 21-ethylorthoformate;
9α-fluoro-11β-hydroxy-16β-methyl-17α-propionyloxy-pregna-1,4-diene-3,20-dione 21-ethylorthoformate;
6α,9α-difluoro-11β-hydroxy-16β-methyl-17α-propionyloxy-pregna-1,4-diene-3,20-dione 21-ethylorthoformate;
6α,6β,9α-trifluoro-11β-hydroxy-16β-methyl-17α-propionyloxy-pregna-1,4-diene-3,20-dione 21-ethylorthoformate;
11β-hydroxy-16β-methyl-17α-pentanoyloxy-pregna-1,4-diene-3,20-dione 21-ethylorthoformate;
9α-chloro-11β-hydroxy-16β-methyl-17α-pentanoyloxy-pregna-1,4-diene-3,20-dione 21-ethylorthoformate;
9α-fluoro-11β-hydroxy-16β-methyl-17α-pentanoyloxy-pregna-1,4-diene-3,20-dione 21-ethylorthoformate;
6α,9α-difluoro-11β-hydroxy-16β-methyl-17α-pentanoyloxy-pregna-1,4-diene-3,20-dione 21-ethylorthoformate;
6α,6β,9α-trifluoro-11β-hydroxy-16β-methyl-17α-pentanoyloxy-pregna-1,4-diene-3,20-dione 21-ethylorthoformate;
17α-decanoyloxy-11β-hydroxy-16β-methyl-pregna-1,4-diene-3,20-dione 21-pentylorthobenzoate;
17α-decanoyloxy-9α-fluoro-11β-hydroxy-16β-methyl-pregna-1,4-diene-3,20-dione 21-pentylorthobenzoate;

6α,9α-dichloro-17α-decanoyloxy-11β-hydroxy-16β-methyl-pregna-1,4-diene-3,20-dione 21-pentylorthobenzoate;
6α,6β,9α-trichloro-17α-decanoyloxy-11β-hydroxy-16β-methyl-pregna-1,4-diene-3,20-dione 21-pentylorthobenzoate;
17α-heptanoyloxy-11β-hydroxy-16β-methyl-pregn-4-ene-3,20-dione 21-ethylorthoformate;
17α-heptanoyloxy-11β-hydroxy-16β-methyl-pregna-1,4-diene-3,20-dione 21-ethylorthoformate;
6α-chloro-17α-heptanoyloxy-11β-hydroxy-16β-methyl-pregn-4-ene-3,20-dione 21-ethylorthoformate;
6α-chloro-17α-heptanoyloxy-11β-hydroxy-16β-methyl-pregna-1,4-diene-3,20-dione 21-ethylorthoformate;
9α-fluoro-11β-17α-dihydroxy-16β-methyl-pregna-1,4,6-triene-3,20-dione 21-ethylorthoformate;
9α-chloro-11β,7α-dihydroxy-16β-methyl-pregna-1,4,6-triene-3,20-dione 21-ethylorthoformate;
6α,6β,9α-trifluoro-17α-heptanoyloxy-11β-hydroxy-16β-methyl-pregna-4-ene-3,20-dione 21-ethylorthoformate;
6α,6β,9α-trifluoro-17α-heptanoyloxy-11β-hydroxy-16β-methyl-pregna-1,4-diene, 3,20-dione 21-ethylorthoformate;
9α-chloro-17α-hydroxy-16β-methyl-pregn-4-ene-3,11,20-trione 21-methylorthoformate;
9α-fluoro-17α-hydroxy-16β-methyl-pregna-1,4-diene-3,11-20-trione 21-methylorthoformate;
6α,6β,9α-trifluoro-17α-hydroxy-16β-methyl-pregn-4-ene-3,11,10-trione 21-methylorthoformate;
16β-methyl-17α-propionyloxy-1,4-diene-3,11,20-trione 21methylorthoformate;
9α-fluoro-16β-methyl-17α-propionyloxy-pregn-4-ene-3,11,20-trione 21-methylorthoformate;
6α,9α-difluoro-16β-methyl-17α-propionyloxy-pregna-1,4-diene-3,11,20-trione 21-methylorthoformate;
16β-methyl-17α-pentanoyloxy-pregn-4-ene-3,11,20-trione 21-methylorthoformate;
9α-chloro-16β-methyl-17α-pentanoyloxy-pregna-1,4-diene-3,11,20-trione 21-methylorthoformate;
6α,9α-difluoro-16β-methyl-17α-pentanoyloxy-pregn-4-ene-3,11,20-trione 21-methylorthoformate;
6α,6β,9α-trifluoro-16β-methyl-17α-pentanoyloxy-pregna-1,4-diene-3,11,20-trione 21-methylorthoformate;
16β-methyl-17α-propionyloxy-pregn-4-ene-3,11,20-trione 21-ethylorthoformate;
9α-chloro-16β-methyl-17α-pentanoyloxy-pregn-4-ene-3,11,20-trione 21-ethylorthoformate;
9α-chloro-17α-hydroxy-16β-methyl-pregna-1,4-diene-3,11-20-trione 21-ethylorthoformate;
6α,6β,9α-trifluoro-17α-hydroxy-16β-methyl-pregna-1,4-diene-3,11,20-trione 21ethylorthoformate;
9α-fluoro-16β-methyl-17α-propionyloxy-pregna-1,4-diene-3,11,20-trione 21-ethylorthoformate;
16β-methyl-17α-pentanoyloxy-pregna-1,4-diene-3,11,20-trione 21-ethylorthoformate;
6α,9α-difluoro-16β-methyl-17α-pentanoyloxy-pregna-1,4-diene-3,11,20-trione 21-ethylorthoformate;
9α-fluoro-17α-decanoyloxy-16β-methyl-pregna-1,4-diene-3,11,20-trione 21-pentylorthobenzoate;
17α-heptanoyloxy-16β-methyl-pregn-4-ene-3,11,20-trione 21-ethylorthoformate;

6α-chloro-17α-heptanoyloxy-16β-methyl-pregna-1,4-diene-3,11,20-trione 21-ethylorthoformate;
6α,6β,9α-trifluoro-17α-heptanoyloxy-16β-methyl-pregna-1,4-diene-3,11,20-trione 21-ethylorthoformate;
9α-fluoro-11β-17α-dihydroxy-16α-methyl-pregna-1,4-diene-3,20-dione 21-cyclic ethylene orthoformate;
6α,9α-difluoro-11β,17α-dihydroxy-16α-methyl-pregna-1,4-diene-3,20-dione 21-cyclic ethylene orthoformate;
6α,6β,9α-trifluoro-11β,17α-dihydroxy-16α-methyl-pregna-1,4-diene-3,20-dione 21-cyclic ethylene orthoformate;
9α-chloro-11β-hydroxy-16α-methyl-17α-propionyloxy-pregna-1,4-diene-3,20-dione 21-cyclic ethylene orthoformate;
9α-fluoro-11β-hydroxy-16α-methyl-17α-propionyloxy-pregn-4-ene-3,20-dione 21-cyclic ethylene orthoformate;
9α-fluoro-11β-hydroxy16α-methyl-17α-propionyloxy-pregna-1,4-diene-3,20-dione 21-cyclic ethylene orthoformate;
9α-fluoro-11β-hydroxy-16α-methyl-17α-pentanoyloxy-pregna-1,4-diene-3,20-dione 21-cyclic ethylene orthoformate;
6α,9α-difluoro-11β-hydroxy-16α-methyl-17α-pentanoyloxy-pregna-1,4-diene-3,20-dione 21-cyclic ethylene orthoformate;
6α,6β,9α-trifluoro-11β-hydroxy-16α-methyl-17α-propionyloxy-pregn-4-ene-3,20-dione 21-cyclic ethylene orthoformate;
9α-fluoro-11β,17α-dihydroxy-16α-methyl-pregna-1,4-diene-3,20-dione 21-cyclic ethylene orthoformate;
6α,9α-difluoro-11β,17α-dihydroxy-16α-methyl-pregna-1,4-diene-3,20-dione 21-acyclic ethylene orthoformate;
9α-fluoro-11β-hydroxy-16α-methyl-17α-propionyloxy-pregna-1,4-diene-3,20-dione 21-cyclic ethylene orthoformate;
6α,9α-difluoro-11β-hydroxy-16α-methyl-17α-propionyloxy-pregna-1,4-diene-3,20-dione 21-cyclic ethylene orthoformate;
9α-fluoro-11β-hydroxy-16α-methyl-17αpentanoyloxy-pregna-1,4-diene-3,20-dione 21-cyclic ethylene orthoformate;
6,α9α-difluoro-11β-hydroxy-16α-methyl-17α-pentanoyloxy-pregna-1,4-diene-3,20-dione 21-cyclic ethylene orthoformate;
9α-fluoro-11β,17α-dihydroxy-16β-methyl-pregna-1,4-diene-3,20-dione 21-cyclic ethylene orthoformate;
6α,9α-difluoro-11β,17α-dihydroxy-16β-methyl-pregna-1,4-diene-3,20-dione 21-cyclic ethylene orthoformate;
9α-fluoro-11β-hydroxy-16β-ethyl-17α-pentanoyloxy-pregna-1,4-diene-3,20-dione 21-cyclic ethylene orthoformate;
6α,9α-difluoro-11β-hydroxy-16β-methyl-17α-pentanoyloxy-pregna-1,4-diene-3,20-dione 21-cyclic ethylene orthoformate; and
6α,6β,9α-trifluoro-11β-hydroxy-16β-methyl-17α-pentanoyloxy-pregna-1,4-diene-3,20-dione 21-cyclic ethylene orthoformate.

Of the compounds of Formula III above, the following compounds, respectively represented by the following structural formulae, are of particular interest:

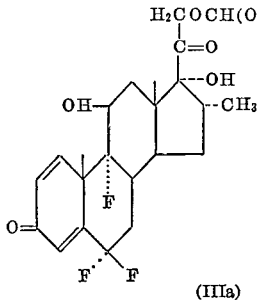

(IIIa)

11β,17α-dihydroxy-16α-methyl-6α,6β,9α-trifluoro-pregna-1,4-diene-3,20-dione 21-methyl-orthoformate

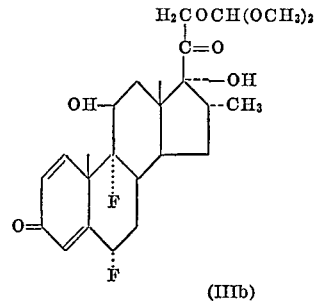

(IIIb)

6α,9α-difluoro-11β,17α-dihydroxy-16α-methyl-pregna-1,4-diene-3,20-dione 21-methylorthoformate

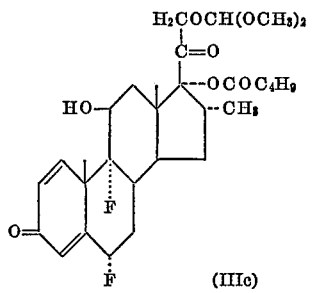

(IIIc)

6α,9α,difluoro - 11β - hydroxy-16α-methyl - 17α - pentanoyloxy-pregna - 1,4 - diene - 3,20 - dione 21-methylorthoformate

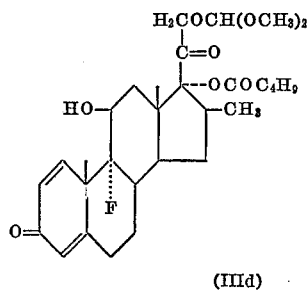

(IIId)

9α - fluoro - 11β - hydroxy - 16β-methyl - 17α-pentanoyloxy-pregna-1,4-diene - 3,20 - dione 21-methylorthoformate

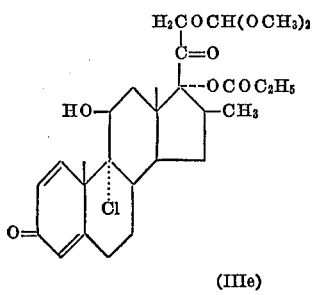

(IIIe)

9α - chloro - 11β - hydroxy-16β-methyl-17α - propionyloxy-pregna-1,4 - diene - 3,20-dione 21-methylorthoformate

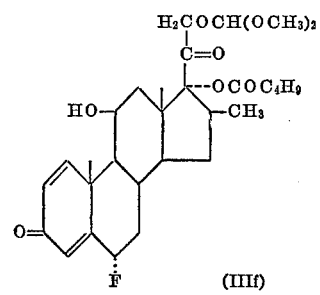

(IIIf)

6α-fluoro - 11β-hydroxy-16α-methyl - 17α-pentanoyloxy-pregna-1,4-diene - 3,20 - diene 21-methylorthoformate 21-orthoester cortical steroids of the present invention encompassed by Formula III also include, for example, those compounds corresponding to the 16α-methyl or 16β-methyl compounds listed above wherein a hydrogen atom is substituted for either the 16α-methyl group or the 16β-methyl group. Of particular interest in this group are:

11β,17α-dihydroxy-pregna-1,4-diene-3,20-dione 21-methylorthoformate;
11β,17α-dihydroxy-pregna-1,4-diene-3,20-dione 21-ethylorthoformate;
9α-fluoro-11β,17α-dihydroxy-pregna-1,4-diene-3,20-dione-21-methylorthoformate;
9α-fluoro-11β,17α-dihydroxy-pregna-1,4-diene-3,20-dione-21-ethylorthoformate;
6α-fluoro-11β,17α-dihydroxy-pregna-1,4-diene-3,20-dione 21-methylorthoformate;
6α-fluoro-11β,17α-dihydroxy-pregna-1,4-diene-3,20-dione 21-ethylforthoformate;
9α,11β-dichloro-17α-hydroxy-pregna-1,4-diene-3,20-dione 21-methylorthoformate; and
9α,11β-dichloro-17α-hydroxy-pregna-1,4-diene-3,20-dione 21-ethylorthoformate;

The process of preparing the 21-orthoesters compounds of this invention is represented by the following schematic overall reaction equation:

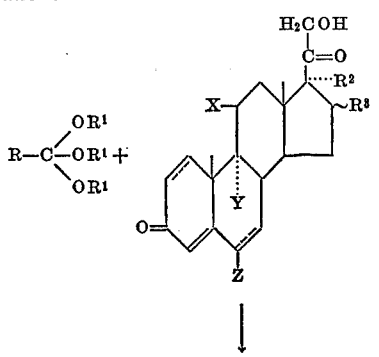

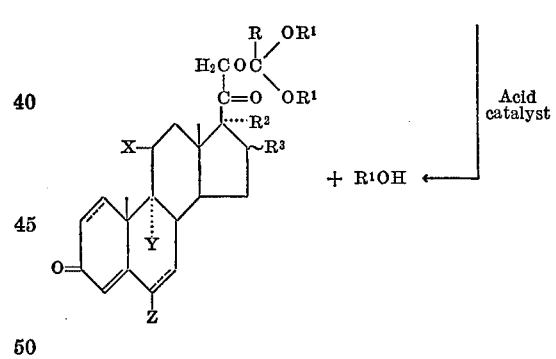

wherein R, R¹, R², R³, X, Y, Z, and the dotted bond lines have the same meanings as set forth above.

The above reaction can be conveniently effected, according to this invention, by reacting a 21-hydroxy cortical steroid corresponding to the 21-orthoester cortical steroid desired, with a suitable orthoester corresponding to the orthoester group desired, in the presence of a suitable strong acid. The strong acid acts only as a catalyst and thus only a catalytic quantity of the acid is required. Suitable strong acids include, for example, perchloric acid, p-toluenesulfonic acid, sulfuric acid, benzenesulfonic acid, and the like.

Although only one mole of the orthoester is stoichiometrically required for reaction with one mole of the 21-hydroxy cortical steroid, it has been found that in order to obtain suitable yields, an excess of the orthoester reactant should be used. Conveniently, the orthoester exchange is carried out by allowing a suspension or solution of the appropriate 21-hydroxy cortical steroid in the undiluted orthoester reagent to react in the presence of an acid catalyst. Alternately, the reaction mixture may consist in part of an inert solvent, e.g. benzene, which serves the dual purposes of bringing the steroid reactant into solution as well as permitting the use of a smaller quantity of the relatively costly orthoester reagent. Reaction temperatures may range from below 0° to the boiling point of the particular solvent-reactant system being employed, but it is operationally convenient to work at or near room temperature. Reaction times may vary over a wide range, from a few minutes to 18 hours or more, depending upon the particular steroid substrate, the orthoester reagent, the mole ratio of orthoester reagent to steroid reactant, the nature and concentration of the acid catalyst employed, and the reaction temperature. The progress of the orthoester exchange reaction is conveniently monitored by thin layer chromatography, and by employing this monitoring technique an optimum combination of the reaction variables enumerated above can be determined by routine experimentation for each steroid-orthoester reaction.

In a useful modification for these reactions where the steroid substrate does not have a free 17α-hydroxy group, the reaction may be conducted in a suitable inert organic solvent, for example, benzene, having a boiling point equal to or greater than the alkyl alcohol byproduct (i.e., $R^1OH$) thereby permitting the easy removal of the alkyl alcohol during the reaction by conducting the reaction at a temperature above the boiling point of the alkyl alcohol, but below the respective boiling points of the solvent, the orthoester reactant, the 21-hydroxy steroid substrate and the 21-orthoester compounds of this invention.

The desired 21-orthoester corticosteroid is subsequently recovered from the reaction mixture by any suitable procedure such as, for example, evaporative concentration, crystallization or thin layer or adsorption column chromatographic separation and purification.

The 21-hydroxy steroid substrate and orthoester starting materials used in preparing the 21-orthoester compounds of this invention can be prepared according to known procedures and in some instances are commercially available. Additional information concerning the preparation of 21-hydroxy steroids suitable for use in the preparation of the compounds of Formula II above can be obtained, for example, from U.S. Pat. Nos. 3,048,581, and 3,126,375; and from Fried et al., J. Am. Chem. Soc., 802,338 (1958) and Mills et al., J. Am. Chem. Soc., 82, 3399 (1960). Additional information concerning the preparation of 21-hydroxy steroids suitable for use in the preparation of the compounds of Formula III above can be found, for example, in U.S. Pats. Nos. 2,894,963; 3,013,-033; and 3,119,748; and in Edwards et al., Proc. Chem. Soc. (London), p. 87 (1959), Edwards et al., J. Am. Chem. Soc., 82, 2318 (1960), and Taub et al., J. Am. Chem. Soc., 80, 4435 (1958). Information concerning the preparation of the orthoester starting materials can be found, for example, in Organic Syntheses—Collective Volume I, ed. by Gilman and Blatt (2nd edit.) p. 258–261, N.Y., Wiley (1941) and references cited therein.

The 21-orthoester cortical steroids compounds of this invention exhibit anti-inflammatory activity in mammals, and can be administered to mammals for the treatment of inflammation in the same manner as the parent 21-hydroxy compounds such as, for example, fluocinolone acetonide (i.e., 6α,9α-difluoro-11β-hydroxy-16α,17α-isopropylidenedioxy-1,4-pregnadiene-3,20 - dione). Further information concerning the application of fluocinolone acetonide, and correspondingly the compounds of this invention, can be had by reference to the 1972 addition of the Physician's Desk Reference published by Medical Economics, Inc.

DESCRIPTION OF SPECIFIC EMBODIMENTS

The following specific description is given to enable those skilled in this art to more clearly understand and practice the present invention. It should not be considered as a limitation upon the scope of the invention but merely as being illustrative and representative thereof.

Examples 1–8 illustrate methods according to this invention for preparing compounds of Formula II, for example, those compounds listed in column 3, line 72, through column 6, line 75 hereof.

Examples 9–14 illustrate methods according to this invention for preparing compounds of Formula III, for example, those compounds listed on page 11, line 19 to page 26, line 16 hereof.

EXAMPLE 1

A stirred suspension of 0.100 g. of 6α,9α-difluoro-11β,21-dihydroxy - 16α,17α - isopropylidenedioxy-pregna-1,4-diene-3,20-dione in 10 ml. of trimethyl orthoformate is treated with 2 drops of a solution containing 0.5 ml. of 70% aqueous perchloric acid in 19.5 ml. of ethyl acetate. Stirring is continued for 1 hour during which time a clear solution results. The reaction mixture is brought to an alkaline pH by addition of an aqueous sodium bicarbonate solution and is extracted with diethyl ether. The organic extracts are washed successively with saturated aqueous sodium bicarbonate solution, water, and saturated brine. 2 drops of triethylamine are added to the extracts to assure basicity. The extracts are dried over anhydrous potassium carbonate and the solvent is evaporated under reduced pressure. The residue is recrystallized from acetone-hexane which contains a drop of triethylamine. There is obtained crystalline 6α,9α-difluoro-11β-hydroxy - 16α,17α - isopropylidenedioxy-pregna-1,4-diene-3,20-dione 21-methylorthoformate.

EXAMPLE 2

A suspension of 0.130 g. of 9α-fluoro-11β,21-dihydroxy-16α,17α-isopropylidenedioxy - pregna-1,4-diene-3,20-dione in 10 ml. of ethyl acetate is treated with 2 ml. of triethyl orthoformate and 5 drops of a solution of 0.25 ml. of 70% aqueous perchloric acid in 100 ml. of ethyl acetate. The mixture is stirred at room temperature for 17 hours, at which time the clear reaction solution is poured into aqueous sodium bicarbonate. Following the remainder of the procedure of Example 1, there is obtained 9α-fluoro-11β-hydroxy - 16α,17α - isopropylidenedioxy-pregna-1,4-diene-3,20-dione 21-ethylorthoformate.

EXAMPLE 3

A solution of 0.200 g. of 9α,11β-dichloro-6α-fluoro-21-hydroxy-16α,17α-isoproylidenedioxy-pregna - 1,4 - diene-3,20-dione in a mixture of 15 ml. of 1,4-dioxane and 10 ml. of benzene is treated with 4 ml. of triethyl orthoacetate and 10 mg. of p-toluenesulfonic acid. The reaction mixture is stirred and heated at the boiling point for 3 hours, during which time approximately 8 ml. of distillate is collected. After being allowed to cool, the reaction mixture is poured into an aqueous sodium bicarbonate solution and extracted with methylene chloride containing a few drops of triethylamine. The crude residue obtained after evaporation of the solvent is purified by thin layer chromatography on silica gel employing a 60% acetone-40% hexane developing system. There is obtained 9α,11β-dichloro - 6α - fluoro-16α,17α-isopropylidenedioxy-pregna-1,4-diene-3,20-dione 21-ethylorthoacetate.

EXAMPLE 4

A suspension of 0.140 g. of 6α,9α-difluoro-21-hydroxy-16α,17α-isopropylidenedioxy-pregna - 1,4 - diene-3,11,20-trione in 15 ml. of benzene is treated with 2 ml. of 2-methoxy-1,3-dioxolane and 5 mg. of p-toluenesulfonic acid. The mixture is stirred and heated at the boiling point while a total of 6 ml. of distillate is collected during 2 hours. After being allowed to cool to room temperature, the reaction mixture is treated in accordance with the remainder of the procedure of Example 3. There is obtained 6α,9α-difluoro - 16α,17α - isopropylidenedioxy-pregna-1,4-diene-3,11,20-thione 21-cyclic ethylene orthoformate.

EXAMPLE 5

Following the procedure of Example 2 using 11β,21-dihydroxy-6α-fluoro - 16α,17α - isopropylidenedioxy-pregna- 1,4-diene-3,20-dione and trimethyl orthoformate as the reactants, there is obtained 6α - fluoro - 11β - hydroxy-16α,17α - isopropylidenedioxy-pregna - 1,4 - diene - 3,20-dione 21-methylorthoformate.

EXAMPLE 6

Following the procedure of Example 4 using 9α,11β-dichloro-6α-fluoro - 21 - hydroxy-16α,17α-isopropylidenedioxy-pregna - 1,4 - diene-3,20-dione and trimethyl orthoformate as the reactants, there is obtained 9α,11β-dichloro - 6α - fluoro-16α,17α-isopropylidenedioxy-pregna-1,4-diene-3,20-dione 21-methylorthoformate.

EXAMPLE 7

Following the procdure of Example 1 using 11β,21-dihydroxy-16α,17α-isopropylidenedioxy-pregna - 1,4 - diene-3,20-dione and trimethyl orthoformate as the reactants, there is obtained 11β,dihydroxy-16α,17α-isopropylidenedioxy-pregna-1,4-diene-3,20-dione 21-methylorthoformate.

EXAMPLE 8

Following the procedure of Example 1 using 11β,21-dihydroxy-9α-fluoro - 16α,17α - isopropylidenedioxy-pregna-1,4-diene-3,20-dione and trimethyl orthoformate as the reactants there is obtained 9α - fluoro - 11β - hydroxy-16α,17α-isopropylidenedioxy-pregna-1,4-diene-3,20 - dione 21-methylorthoformate.

In a similar manner to the methods of Examples 1–4, using reactants as dictated by the particular steroid 21-orthoester desired, the compounds listed on page 6, line 11 to page 11 line 18 can be prepared.

EXAMPLE 9

A stirred slurry of 0.200 g. of 6α,9α-difluoro-11β,17α,21-trihydroxy-16α-methyl-pregna-1,4-diene-3,20 - dione in 50 ml. of trimethyl orthoformate is treated with 25 drops of a solution containing 0.5 ml. of 70% aqueous perchloric acid in 200 ml. of ethyl acetate. After being stirred for 18 hours at room temperature, the mixture is filtered to separate unreacted starting material. The filtrates are treated with an excess of aqueous sodium bicarbonate followed by extraction with diethyl ether. The extracts are washed successively with aqueous sodium bicarbonate, water, and saturated brine, dried over anhydrous potassium carbonate to which there has been added 2 drops of triethylamine, and evaporated to dryness under reduced pressure. The crude crystalline residue so obtained is purified by preparative thin layer chromatography on silica gel employing a 5% acetone-95% chloroform eluant system. There is obtained crystalline 6α,9α-difluoro - 11β,17α - dihydroxy - 16α - methyl-pregna-1,4-diene-3,20-dione 21-methylorthoformate.

EXAMPLE 10

A suspension of 0.085 g. 11β,21-dihydroxy-9α-fluoro-16β-methyl-17α-pentanoyloxy-pregna-1,4-diene - 3,20 - dione in 8 ml. of ethyl acetate is treated with 1 ml. of trimethyl orthoformate and 3 drops of a solution of 0.25 ml. of 70% aqueous perchloric acid in 100 ml. of ethyl acetate. After stirring for 2 hours at room temperature, the now-homogeneous solution is poured into an aqueous sodium bicarbonate solution. Following the remainder of the procedure of Example 9, there is obtained 9α-fluoro-11β-hydroxy-16β-methyl-17α-pentanoyloxy-pregna-1,4 - diene-3,20-dione 21-methylorthoformate.

EXAMPLE 11

A suspension of 0.110 g. of 6α,9α-difluoro-16α-methyl-11β,17α,21-trihydroxy-pregna-1,4-diene-3,20-dione in 8 ml. of ethyl acetate is treated with 1.5 ml. of 2-methoxy-1,3-dioxolane and 6 drops of a solution containing 0.25 ml. of 70% aqueous perchloric acid in 100 ml. of ethyl acetate. After stirring for 1 hour at room temperature, the homogeneous solution is poured into aqueous sodium bicarbonate solution. Following the remainder of the procedure of Example 9 utilizing thin layer chromatography on silica gel employing a 90% chloroform–10% acetone developing solvent system, there is obtained 6α,9α-difluoro-11β,17α-dihydroxy-16α-methyl-pregna-1,4-diene-3,20 - dione 21-cyclic ethylene orthoformate.

EXAMPLE 12

Following the procedure of Example 9 using 16α-methyl-6α,6β,9α-trifluoro-11β,17α,21-trihydroxy-pregna - 1,4 - diene-3, 20-dione and trimethyl orthorformate as the reactants, there is obtained 11β,17α-dihydroxy-16α-methyl-6α,6β,9α-trifluoro-pregna-1,4-diene-3,20 - dione 21 - methylorthoformate.

EXAMPLE 13

Following the procedure of Example 11 using 6α,9α-difluoro-11β,21-dihydroxy-16α-methyl-17α - pentanoyloxy-pregna-1,4-diene-3,20-dione and trimethyl orthoformate as the reactants, there is obtained 6α,9α-difluoro - 11β - hydroxy-16α-methyl-17α-pentanoyloxy-pregna-1,4-diene - 3, 20-dione 21-methylorthoformate.

EXAMPLE 14

Following the procedure of Example 10 using 11β,21-dihydroxy-9α-chloro-16β - methyl - 17α - propionyloxy-pregna-1,4-diene-3,20-dione and trimethyl orthoformate as the reactants, there is obtained 9α-chloro-11β-hydroxy-16β-methyl-17α-propionyloxy-pregna-1,4-diene-3,20-dione 21-methylorthoformate.

In similar manner to the methods of Examples 9–11, using reactants as dictated by the particular steroid 21-orthoester desired, the compounds listed on page 11, line 19 to page 26, line 16 can be prepared.

While the present invention has been described with reference to specific embodiments thereof, it should be understood by those skilled in this art that various changes may be made and equivalents may be substituted without departing from the true spirit and scope of the invention. In addition, many modifications may be made to adopt a particular situation, material or composition of matter, process, process step or steps, or then-present objective to the spirit of this invention without departing from its essential teachings.

What is claimed is:

1. A compound having the formula:

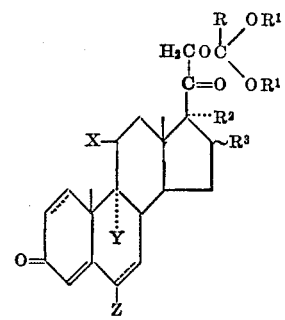

wherein R is H, alkyl having from one to ten carbon atoms, cycloalkyl having 3 to 10 carbon atoms, or aryl; $R^1$ is a lower alkyl having from 1 to 5 carbon atoms, or together the two $R^1$ radicals form a monocyclic heterocyclic group having 3 or 4 carbon ring atoms; $R^2$ is hydroxy or acyloxy having from 1 to 12 carbon atoms; $R^3$ is H, α-methyl or β-methyl, or $R^2$ and $R^3$ together form the group

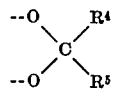

wherein $R^4$ and $R^5$ are independently selected from the group consisting of H, lower alkyls having from 1 to 5 carbon atoms, and aryl or together with the carbon to which they are joined $R^4$ and $R^5$ form a monocyclicalkyl group having 3 to 6 carbon atoms or a monocyclic heterocyclic group; when a single bond exists between C-6 and C-7, Z represents

where Z¹ is H, fluoro, chloro, or methyl, and Z² is H or fluoro, but Z² can be fluoro only when Z¹ is fluoro, and when a double bond exists between C-6 and C-7, Z is H, fluoro, chloro, or methyl; X is oxo or the group

wherein R⁶ is hydroxy, fluoro, or chloro; Y is H, fluoro, or chloro, but when R⁶ is fluoro, Y is either H or chloro; and the dotted bond lines between the 1- and 2-position of the steroid A ring and the 6- and 7-position of the steroid B ring indicate either a single or a double bond.

2. The compound of claim 1 having the formula:

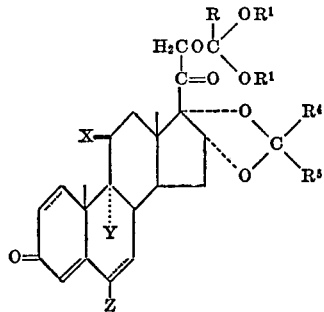

wherein R, R¹, R⁴, R⁵, X, Y, Z, and the dotted bond lines are as defined in claim 1.

3. The compound of claim 2 wherein said compound is 6α,9α-difluoro-11β-hydroxy-16α,17α - isopropylidenedioxy-pregna-1,4-diene-3,20-dione 21-methylorthoformate.

4. The compound of claim 2 wherein said compound is 6α-fluoro-11β - hydroxy - 16α,17α - isopropylidenedioxy-pregna-1,4-diene-3,20-dione 21-methylorthoformate.

5. The compound of claim 2 wherein said compound is 9α,11β-dichloro-6α-fluoro - 16α,17α - isopropylidenedioxy-pregna-1 4-diene-3,20-dione 21-methylorthoformate.

6. The compound of claim 2 wherein said compound is 11β-hydroxy-16α,17α-isopropylidenedioxy-pregna - 1,4-diene-3,20-dione 21-methylorthoformate.

7. The compound of claim 2 wherein said compound is 9α-fluoro-11β-hydroxy-16α,17α - isopropylidenedioxy-pregna-1,4-diene-3,20-dione 21-methylorthoformate.

8. The compound of claim 1 having the formula:

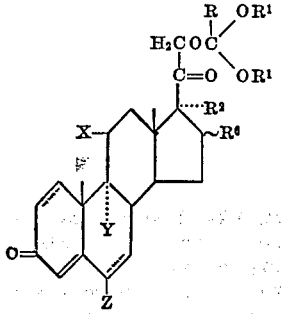

wherein R⁶ is H, α-methyl or β-methyl; R, R¹, R², X, Y, Z and the dotted bond lines are as defined in claim 1.

9. A compound of claim 8 wherein said compound is 9α-fluoro-11β-hydroxy - 16β - methyl17α-pentanoyloxy-pregna-1,4-diene-3,20-dione 21-methylorthoformate.

10. A compound of claim 8 wherein said compound is 9α-chloro-11β-hydroxy 16β - methyl - 17α - propionyloxy-pregna-1,4-diene-3,20-dione 21-methylorthoformate.

11. A compound of claim 8 wherein said compound is 6α,9α-difluoro-11β-hydroxy - 16α - methyl-17α-pentanoyl-pregna-1, diene-3,20-dione 21-methylorthoformate.

12. The compound of claim 8 wherein said compound is 6α-fluoro-11β-hydroxy - 16α - methyl - 17α - pentanoyloxy-pregna-1, 4-diene-3,20-diene 21-methylorthoformate.

13. A compound of claim 8 wherein said compound is 6α,6β,9α - trifluoro - 11β,17α - dihydroxy - 16α - methyl-pregna-1,4-diene-3,20-dione 21-methylorthoformate.

14. The compound of claim 8 wherein said compound is 6α,9α - difluoro - 11β,17α - dihydroxy - 16α - methyl-pregna-1,4-diene-3,20-dione 21-methylorthoformate.

15. A process for preparing the compounds of claim 1 which comprises reacting a 21-hydroxy cortico steroid with an orthoester having the formula:

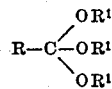

wherein R and R¹ are as defined in claim 1, in the presence of a catalytic quantity of a strong acid.

16. The process of claim 15 wherein the reaction is conducted in an excess of said orthoester reactant.

17. The process of claim 15 wherein the reaction is conducted in the presence of an inert organic solvent.

18. The process of claim 15 wherein said strong acid is selected from the group consisting of perchloric acid, p-toluenesulfonic acid, sulfuric acid and benzenesulfonic acid.

19. The process of claim 15 wherein the reaction is driven to completion by distillation from the reaction mixture of the alcohol byproduct R¹OH.

References Cited

UNITED STATES PATENTS

| | | | |
|---|---|---|---|
| 3,422,193 | 1/1969 | Shapiro et al. | 424—243 |
| 3,464,980 | 9/1969 | Bruce | 260—239.55 |
| 3,621,014 | 11/1971 | Stache et al. | 260—239.55 |

HENRY A. FRENCH, Primary Examiner

U.S. Cl. X.R.

260—397.45, 999

UNITED STATES PATENT OFFICE
CERTIFICATE OF CORRECTION

PATENT NO. : 3,733,318
DATED : May 15, 1973
INVENTOR(S) : Michael Marx

It is certified that error appears in the above-identified patent and that said Letters Patent are hereby corrected as shown below:

In columns 5 and 6, in formula (IIc),

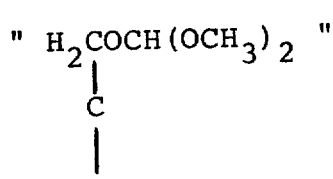   should read   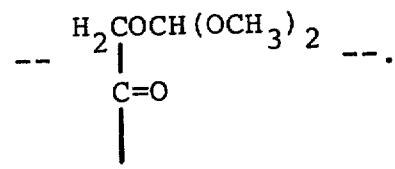

At the bottom of column 6, in formula (IIe),

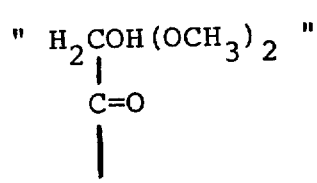   should read   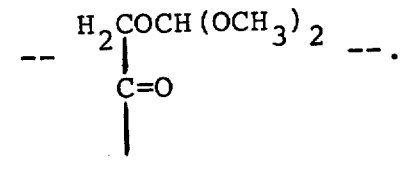

At the bottom of column 6, in formula (IIe),

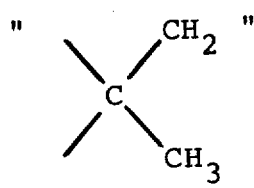   should read   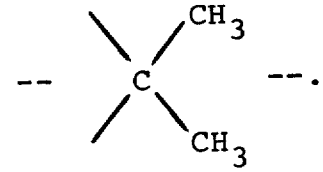

Signed and Sealed this twenty-eight Day of October 1975

[SEAL]

Attest:

RUTH C. MASON
Attesting Officer

C. MARSHALL DANN
Commissioner of Patents and Trademarks